(12) United States Patent
McDuff

(10) Patent No.: US 11,055,418 B2
(45) Date of Patent: *Jul. 6, 2021

(54) DETECTION OF COMPILER INJECTED SECURITY FLAWS

(71) Applicant: INTERNATIONAL BUSINESS MACHINES CORPORATION, Armonk, NY (US)

(72) Inventor: Steve McDuff, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,317

(22) Filed: Sep. 25, 2019

(65) Prior Publication Data

US 2020/0019712 A1 Jan. 16, 2020

Related U.S. Application Data

(63) Continuation of application No. 15/366,253, filed on Dec. 1, 2016, now Pat. No. 10,521,591.

(51) Int. Cl.
*G06F 21/57* (2013.01)
*G06F 8/53* (2018.01)

(52) U.S. Cl.
CPC .............. *G06F 21/577* (2013.01); *G06F 8/53* (2013.01); *G06F 2221/033* (2013.01)

(58) Field of Classification Search
CPC .... G06F 21/577; G06F 2221/033; G06F 8/40; G06F 8/42; G06F 8/53; G06F 8/71; G06F 8/73; G06F 8/74; G06F 8/75; G06F 8/427; G06F 8/4435; G06F 8/44365; G05B 2219/2328; G05B 2219/2371; G06G 11/3624

See application file for complete search history.

(56) References Cited

U.S. PATENT DOCUMENTS 8,532,978 B1 9/2013 Turner
10,031,842 B2 * 7/2018 Ioualalen ................ G06F 8/443
(Continued)

OTHER PUBLICATIONS

Bruce Schneier, "Schneier on Security—Countering 'Trusting Trust'", Blog post https://www.schneier.com/blog/archives/2006/01/countering_trus.html. Accessed on Aug. 10, 2016. pp. 1-28.
(Continued)

*Primary Examiner* — Ashokkumar B Patel
*Assistant Examiner* — William B Jones
(74) *Attorney, Agent, or Firm* — Tutunjian & Bitetto, P.C.; Scott Dobson

(57) ABSTRACT

A computer-implemented method is provided for detecting compiler-injected security flaws. The computer-implemented method includes receiving source code, compiling the source code, reverse engineering the compiled source code, comparing operations performed by the source code and the reverse engineered source code, identifying differences between the source code and the reverse engineered source code, and creating a list of differences. The list of differences includes operations that are present in the source code and missing from binary code. Alternatively, the list of differences includes operations that are present in binary code and missing from the source code.

20 Claims, 5 Drawing Sheets

(56) References Cited

U.S. PATENT DOCUMENTS

| | | | |
|---|---|---|---|
| 2010/0198799 A1* | 8/2010 | Krishnan | G06F 11/3696 707/702 |
| 2015/0106795 A1 | 4/2015 | Rioux | |
| 2015/0295891 A1* | 10/2015 | Goyal | H04L 63/0209 726/11 |
| 2015/0317138 A1* | 11/2015 | Rahbar | G06F 8/4436 717/146 |
| 2018/0157843 A1* | 6/2018 | McDuff | G06F 8/53 |

OTHER PUBLICATIONS

Wikipedia, "The Ken Thompson Hack", http://wiki.c2.com/?TheKenThompsonHack. Accessed on Aug. 10, 2016. pp. 1-4.
List of IBM Patents or Patent Applications Treated as Related dated Sep. 25, 2019, 2 pages.

* cited by examiner

DETECTION OF COMPILER INJECTED SECURITY FLAWS

BACKGROUND

Technical Field

The present invention relates generally to computing systems, and more specifically, to systems and methods for detecting compiler injected security flaws.

Description of the Related Art

Software, in its compiled form, is intended to be executed on a computing device, such as a personal computer. Software is comprised of machine language or byte code (i.e., code that a computer can read and execute). Generally, machine language and byte code are comprised of binary instructions i.e., ones and zeros.

Generally speaking, it is impractical/impossible for a person to view, read, or manipulate machine language or byte code. On the other hand, high level (i.e., text-based) programming languages (e.g., C, C++ & FORTRAN) were created to simplify programming by making it faster and easier. These high level languages are composed of human-readable language elements, thus allowing for simplified understanding by computer programmers. For example, while a conditional "if" statement may be represented by many ones and zeros in compiled code, it may be represented by the word "IF" in high level language code. Accordingly, a computer programmer may easily be able to read, modify, and understand the source code of a high level language.

SUMMARY

In accordance with one embodiment, a computer-implemented method executed on at least one processor for detecting compiler-injected security flaws is provided. The computer-implemented method includes receiving source code, compiling the source code, reverse engineering the compiled source code, comparing operations performed by the source code and the reverse engineered source code, identifying differences between the source code and the reverse engineered source code, and creating a list of differences.

In accordance with one embodiment, a computer-implemented method executed on at least one processor for identifying code discrepancies is provided. The computer-implemented method includes comparing operations performed by source code and reverse engineered source code, determining if boundaries of methods between the source code and the reverse engineered source code match, if a mismatch is detected, identifying differences between the source code and the reverse engineered source code, and creating a list of differences.

In accordance with another embodiment, a system for detecting compiler-injected security flaws is provided. The system includes a memory and at least one processor in communication with the memory, wherein the computer system is configured to receive source code, compile the source code, reverse engineer the compiled source code, compare operations performed by the source code and the reverse engineered source code, identify differences between the source code and the reverse engineered source code, and create a list of differences.

Furthermore, embodiments can take the form of a related computer program product, accessible from a computer-usable or computer-readable medium providing program code for use, by or in connection with a computer or any instruction execution system. For the purpose of this description, a computer-usable or computer-readable medium can be any apparatus that can contain means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
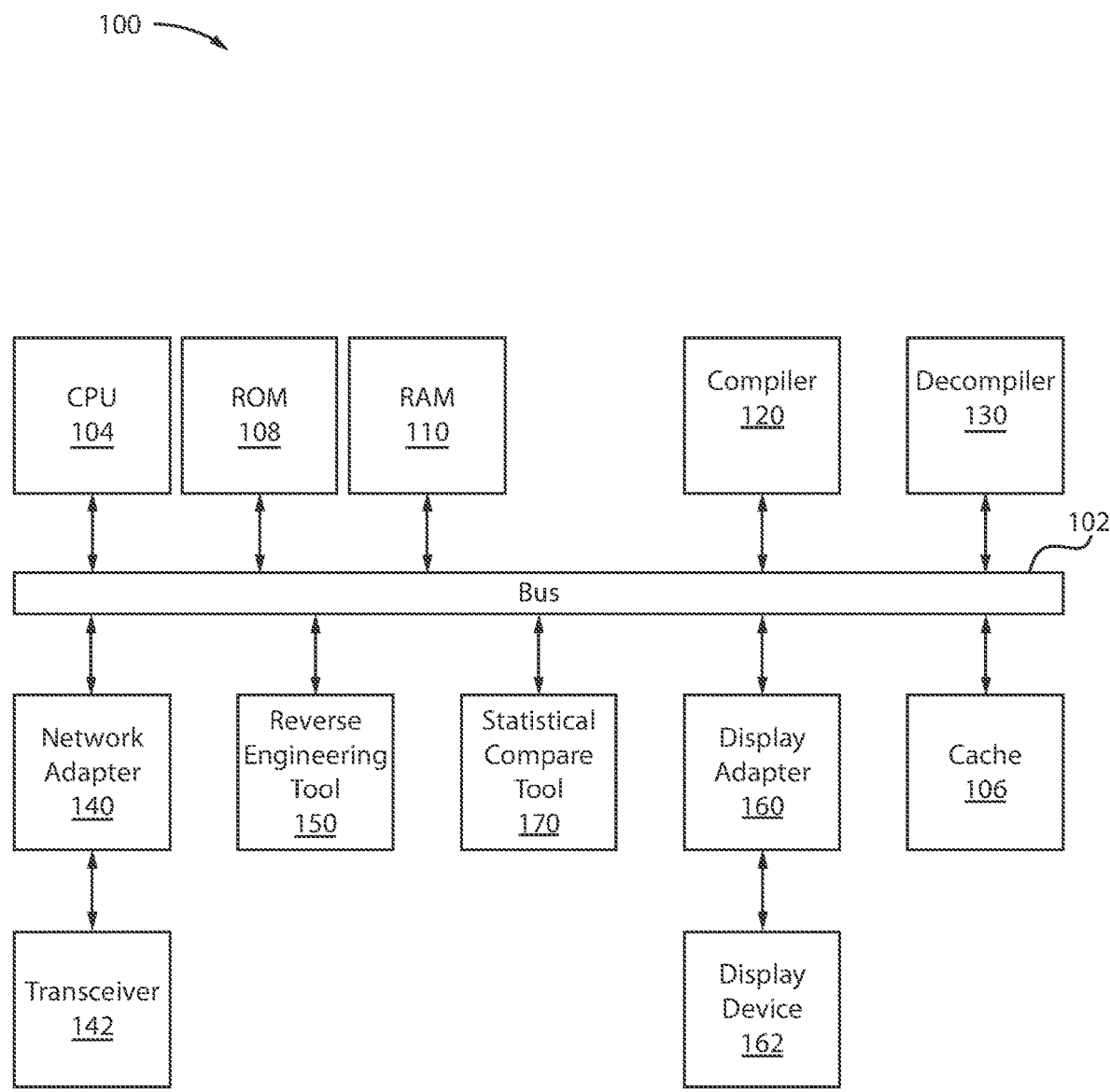
FIG. 1 is a block/flow diagram of an exemplary computing system for detecting compiler-injected security flaws, in accordance with an embodiment of the present invention.

In one or more embodiments, a technique is presented to detect compiler injected security holes/flaws by using a separate and distinct tool to reverse engineer the compiled code and to perform a statistical comparison between the reverse engineered code and the actual or original code to detect abnormalities/flaws/discrepancies.

In one or more embodiments, the statistical comparison tool would then perform a comparison of the source code and the reverse engineered source code to identify areas in the code that have significant differences and produce a list of those differences for further analysis.

In one or more embodiments, the comparison tool would have to deal with various compiler optimization techniques such as code inlining and operation reordering. For code inlining, when the comparison tool detects a block of new code and a missing method call, the statistical tool attempts to correlate the new block of code with the missing method code to detect inlining. To detect operation reordering, the statistical tool creates an inventory of checks and operations performed within a scope of a code block. A comparison can then be performed that ignores or rejects or dismisses ordering between the source code and the reverse engineered code. Once the comparison is complete, the list of differences contains a list of operations that are present in the source code, but missing in the binary code. Alternatively, the list of differences contains operations that are present in the binary code, but missing in the source code.

In one or more embodiments, the statistical comparison engine works as follows. For the source code, it would analyze the boundary of each method and determine an inventory of calls made, as well as their relationship. The reverse engineered code is analyzed to determine the boundaries of methods and match them with actual methods in the source code. The statistical analysis then compares the operations performed by both the source and the reverse engineered code and determines if the operation count matches. To do so, it would come up with a valid range of value of primitive operations.

This budget would be adjusted for multiple permutations based on known compiler outputs. Some compilers can optimize loops to have multiple jump condition locations. The statistical comparison tool then compares the inventory of operations performed in the reverse engineered code with the list of legal inventory of operations that the source code wants to perform. If none of the matches work, an alert or warning or notification can be raised/triggered. The statistical comparison tool could go a step further and match potential sequences of operations and raise/trigger warnings or notifications if the sequence of the reverse engineered code doesn't match the sequence of the source code. Once again, the statistical tool would have to know how compilers can legally reorder operations so that it doesn't raise an alarm or warning for no reason.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this invention.

The present subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings in which like numerals represent the same or similar elements and initially to FIG. 1, a block/flow diagram of an exemplary computing system for detecting compiler-injected security flaws is presented, in accordance with an embodiment of the present invention.

An exemplary security flaw detection system 100 to which the present invention can be applied is shown in accordance with one embodiment. The security flaw detection system 100 includes at least one processor (CPU) 104 operatively coupled to other components via a system bus 102. A cache 106, a Read Only Memory (ROM) 108, a Random Access Memory (RAM) 110, a compiler 120, a decompiler 130, a network adapter 140, a reverse engineering tool 150, a display adapter 160, and a statistical compare or comparison tool 170 are operatively coupled to the system bus 102.

A transceiver 142 is operatively coupled to the system bus 102 by network adapter 140. A display device 162 is operatively coupled to system bus 102 by display adapter 160.

Figure 2:
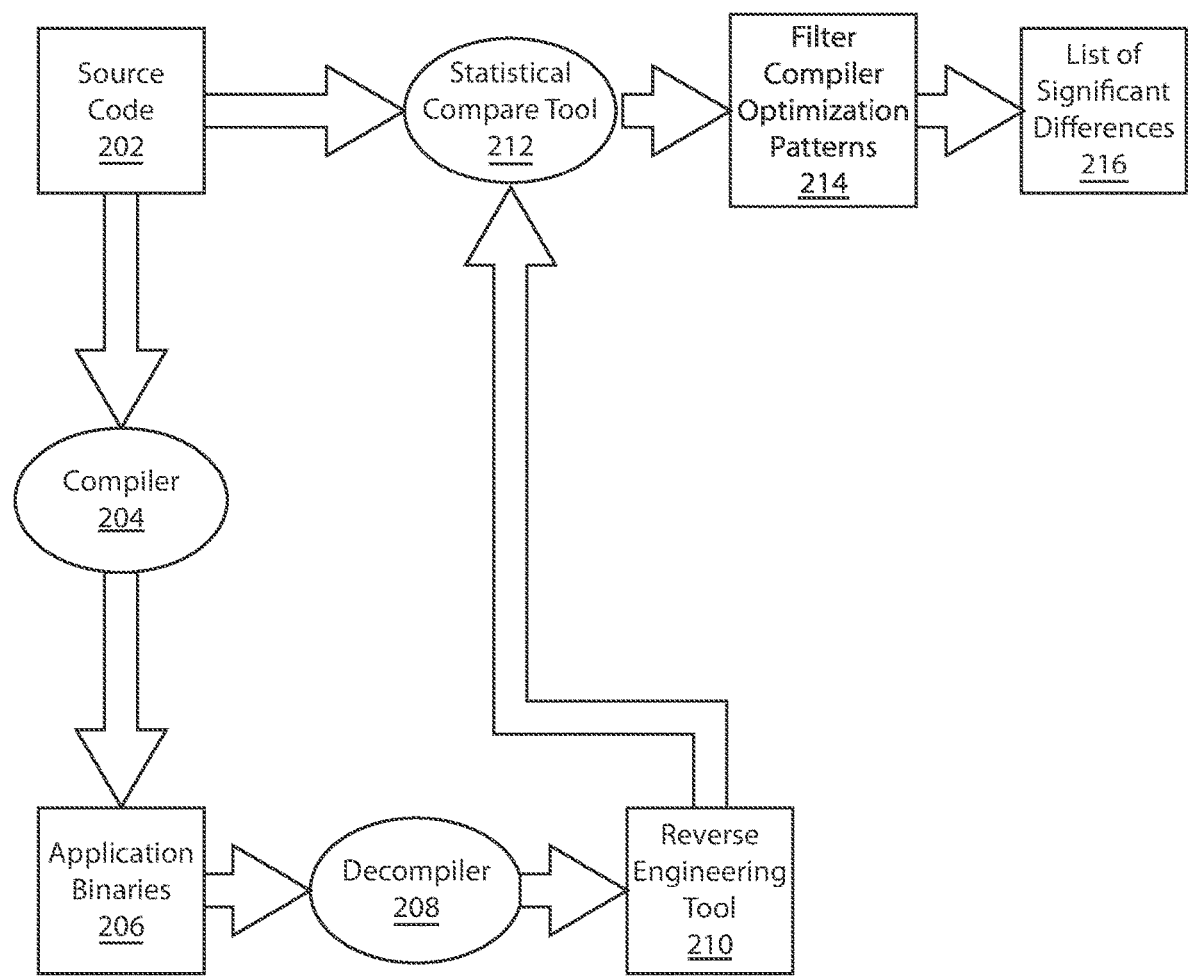
FIG. 2 is a block/flow diagram of an exemplary method for detecting compiler-injected security flaws, in accordance with an embodiment of the present invention.

FIG. 2 is a block/flow diagram of an exemplary method for detecting compiler-injected security flaws, in accordance with an embodiment of the present invention.

The source code 202 is received by the compiler 204. The compiled source code is then received by the application binary interface 206. The compiled source code then goes through a decompiler 208 and a reverse engineering module 210. A statistical compare or comparison tool 212 receives the source code 202 and the reverse engineered code 210. The source code 202 and the reverse engineered code 210 are compared to determine a list of differences 216. The list of differences 216 can be displayed on a display device 162 (FIG. 1). One or more notifications can also be sent to a user when differences are detected. Optionally, a filter 214 can be provided before the list of differences 216. The filter 214 can be used to remove patterns that match compiler optimizations. The filter 214 is discussed further below.

Concerning compiler 204, compilers are generally used to transform one representation of a computer program into another representation. Typically, but not exclusively, compilers are used to transform a human-readable form of a program, such as source code, into a machine-readable form, such as object code.

One type of compiler is an optimizing compiler, which optimizes object code in order to enhance its performance. An optimizing compiler can attempt to enhance performance by reducing the overhead associated with two common, programming techniques known as procedural programming and object-oriented programming.

A computer program suitable for compilation by a compiler is composed of a series of "statements". Some statements generate, modify, retrieve, or store information. Other statements can control the flow of the program, for example, by testing the value of a variable and causing program flow to continue in different directions based on that value. In most programs of any significant length, the statements are collected into "procedures," which perform well-defined functions and can be used in potentially multiple places within the program. Frequently, the procedures in a large program are further collected into "modules," each of which is responsible for a particular major subset of the functions of the program. In a program structure of this kind, the compiler is used to compile the modules individually, after which the compiled modules are "linked" together to form a single, cohesive computer program. This approach allows the programmer to upgrade or debug, and then re-compile, each module separately, without the need for re-compiling the other modules.

A compiler can reside within the memory of the computer system upon which the object code generated by the compiler is executed. Alternatively, a compiler can be a cross-compiler, which resides on one computer system to generate object code for execution on another computer system. Either type of compiler can be used consistent with the exemplary embodiments of the present invention.

Concerning decompiler 208, the general purpose of a decompiler is to take executable code and return it back into a human-readable representation that allows a programmer to analyze the functions of the software and, in particular, its flaws and vulnerability to exploitation and/or hacking.

In preparing a human-readable representation of compiled software code, a decompiler must determine both the control flow of the program, as well as the data flow. "Control flow" refers to the logical execution sequence of program instructions beginning, logically, at the beginning, traversing various loops and control-transferring statements (branches), and concluding with the end or termination point of the program. "Data flow" refers to the process within the program whereby variables (or data storage elements, i.e., data that is stored in program memory either dynamically or statically on some external memory unit, such as a hard drive) are read from and/or written to memory. Data flow includes the process whereby variables or data inputs or outputs are defined by name and content and used and/or modified (i.e., redefined) during the execution of the program. Programmers of ordinary skill in the art will of course realize that many high-level languages require some sort of definition or typecasting of each variable before its first use. The data flow analysis portion of the decompilation process is not, however, concerned with initial declaration of data type but rather determining when and where variables are defined, how they are parsed, and whether they are local to a particular process or sub process, or globally available ("global") for use throughout the program.

Concerning ABI 206, ABI 206 is a contract between pieces of binary code. The ABI 206 defines the mechanisms by which functions are invoked, how parameters are passed between caller and callee, how return values are provided to callers, how libraries are implemented, and how programs are loaded into memory. Thus, the ABI 206 is enforced by the linker. The ABI 206 defines the rules about how unrelated code must work together. The ABI 206 also defines rules about how processes coexist on the same system. For example, on a Unix system, an ABI might define how signals are executed, how a process invokes system calls, what endianness is used, and how stacks grow. In that sense, an ABI is a set of rules enforced by the operating system (OS) on a specific architecture. The ABI 206 can be, e.g., defined by the kernel, the toolchain, and the architecture.

In one example, the statistical compare tool 212 can work as follows. For the source code 202, it would analyze the boundary of each method and determine an inventory of calls made, we well as their relationship to each other.

For instance, a method can be analyzed to have:
10 remove method invocations inventoried by name;
3 FOR loops;
5 IF conditions;
3 ELSE conditions;
1 WHILE loop; and
15 mathematical operations (+, −, *, /, ||, &&, etc. . . . ).

The reverse engineered code 210 can be analyzed to determine the boundaries of methods and match them with actual methods in the source code 202.

Such analysis usually reveals a more primitive set of operations such as:
Registry assignments;
Mathematical operations on variables (+, −, *, /, ||, &&, etc. . . . );
IF condition checks;
Invocation of remote methods;
Jump operations; and
Code labels for jumps.

The statistical analysis or compare tool 212 would then compare the operations performed by both the source code 202 and the reverse engineered code 210 and determine if the operation count matches. To do so, statistical analysis or compare tool 212 would have come up with a valid range of value of primitive operations. For instance, a FOR loop can translate into:
One registry assignment (initialize the loop variable) (i=0 for instance);
One label at the beginning of the loop;
One mathematical on the loop variable registry (i++ for instance);
A set of operations related to the code in the loop;
An IF condition at the end of the loop to detect the end; and
A jump operation to restart the loop.

This budget would be adjusted for multiple permutations based on known compiler outputs. Some compilers, e.g., can optimize loops to have multiple jump condition locations. The statistical compare tool 212 would then compare the inventory of operations performed in the reverse engineered code 210 with the list of legal inventory of operations that the source code 202 wants to perform. If none of the matches work, an alert (or warning or notification) can be triggered and, e.g., sent to a user and displayed on a display device for further analysis.

The statistical compare tool 212 could go a step further and match potential sequences of operations and raise warnings or notifications if the sequence of the reverse engineered code 210 doesn't match the sequence of the source code 202.

Here is an example execution: If the compiler 204 injects a new condition in an IF statement during a password check so that the password "123" will always work, this would result in the following additional operations that wouldn't show up in the original source code 202:
OR clause;
IF check for string match; and
Call to string match method.

The statistical analysis tool 212 would then determine that those three (3) operations weren't in the legal operation budget for a method and raise an alert or warning or notification. The statistical analysis or compare tool 212 could also look at the location in which this new operation is raised/triggered and highlight this in the original source code 202 to provide clues or indications to the users who would analyze the alert or warning or notification. In this way, the impact of the unintended binary code change can be determined/analyzed efficiently.

In another embodiment, a false-positive can be eliminated by creating a list of known compiler optimization patterns. A false-positive denotes an error in an evaluation process resulting in mistaken detection of a condition tested. Stated differently, a condition has been incorrectly detected and reported. Since compilers perform several valid changes to the compiled code to optimize their execution, those optimization changes can be tracked, recorded, and analyzed. Types of optimization patterns formed can further be identified/categorized. Additionally, some optimization changes can be ignored while scaling for discrepancies. In one example, if some operations are allowed to be re-ordered within a specific scope, an out-of-order discrepancy would be verified against this rule and eliminate false-positives. Thus, by creating a list of optimization patterns, conditions can be filtered by filter 214 (FIG. 2) based on their validity to eliminate false-positives. The filter 214 can be referred to as filter compiler optimization patterns. The filter 214 can be used to remove patterns that match compiler optimizations.

Figure 3:
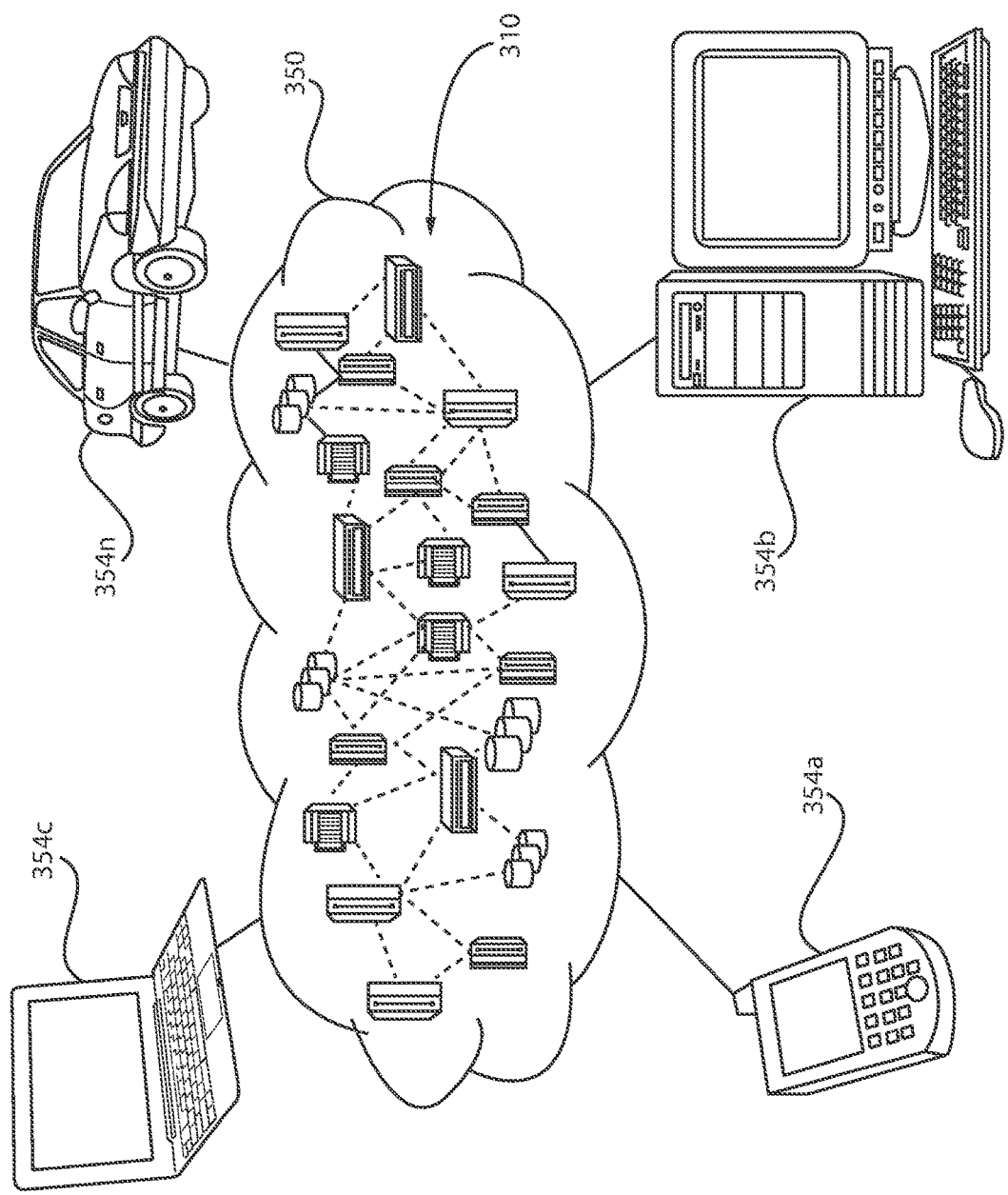
FIG. 3 is a block/flow diagram of an exemplary cloud computing environment, in accordance with an embodiment of the present invention.

FIG. 3 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 3, illustrative cloud computing environment 350 is depicted for enabling use cases of the present invention. As shown, cloud computing environment 350 includes one or more cloud computing nodes 310 with which local computing devices used by cloud consumers, such as, for example, personal digital assistant (PDA) or cellular telephone 354A, desktop computer 354B, laptop computer 354C, and/or automobile computer system 354N can communicate. Nodes 310 can communicate with one another. They can be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 3 are intended to be illustrative only and that computing nodes 310 and cloud computing environment 350 can communicate with any type of computerized device over any type of network and/or network addressable connection (e.g., using a web browser).

Figure 4:
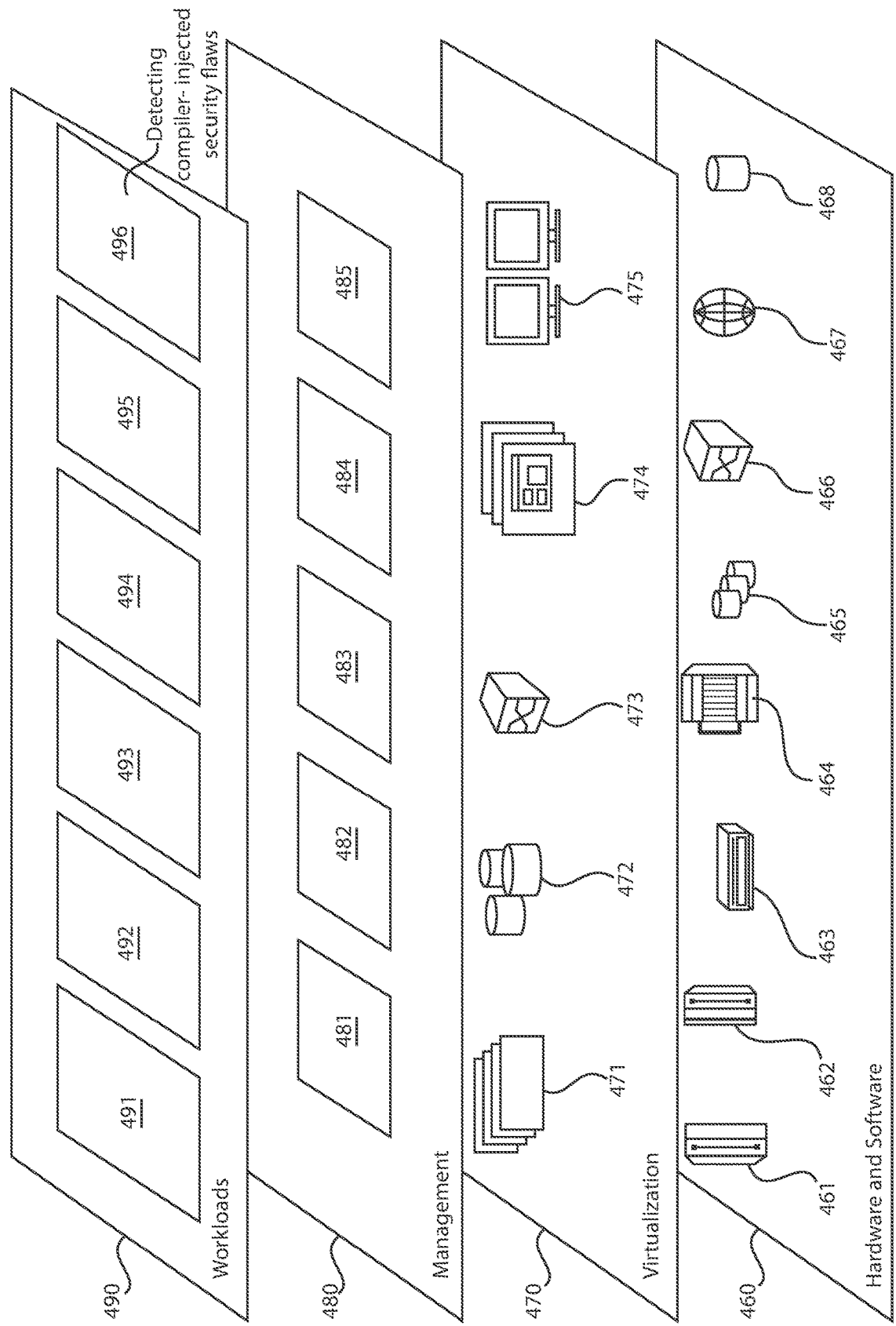
FIG. 4 is a schematic diagram of exemplary abstraction model layers, in accordance with an embodiment of the present invention.

FIG. 4 is a schematic diagram of exemplary abstraction model layers, in accordance with an embodiment of the present invention.

It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities can be provided: virtual servers 471; virtual storage 472; virtual networks 473, including virtual private networks; virtual applications and operating systems 474; and virtual clients 475.

In one example, management layer 480 can provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment can be utilized. Examples of workloads and functions which can be provided from this layer include: mapping and navigation 491; software development and lifecycle management 492; virtual classroom education delivery 493; data analytics processing 494; transaction processing 495; and detecting compiler-injected security flaws 496.

Figure 5:
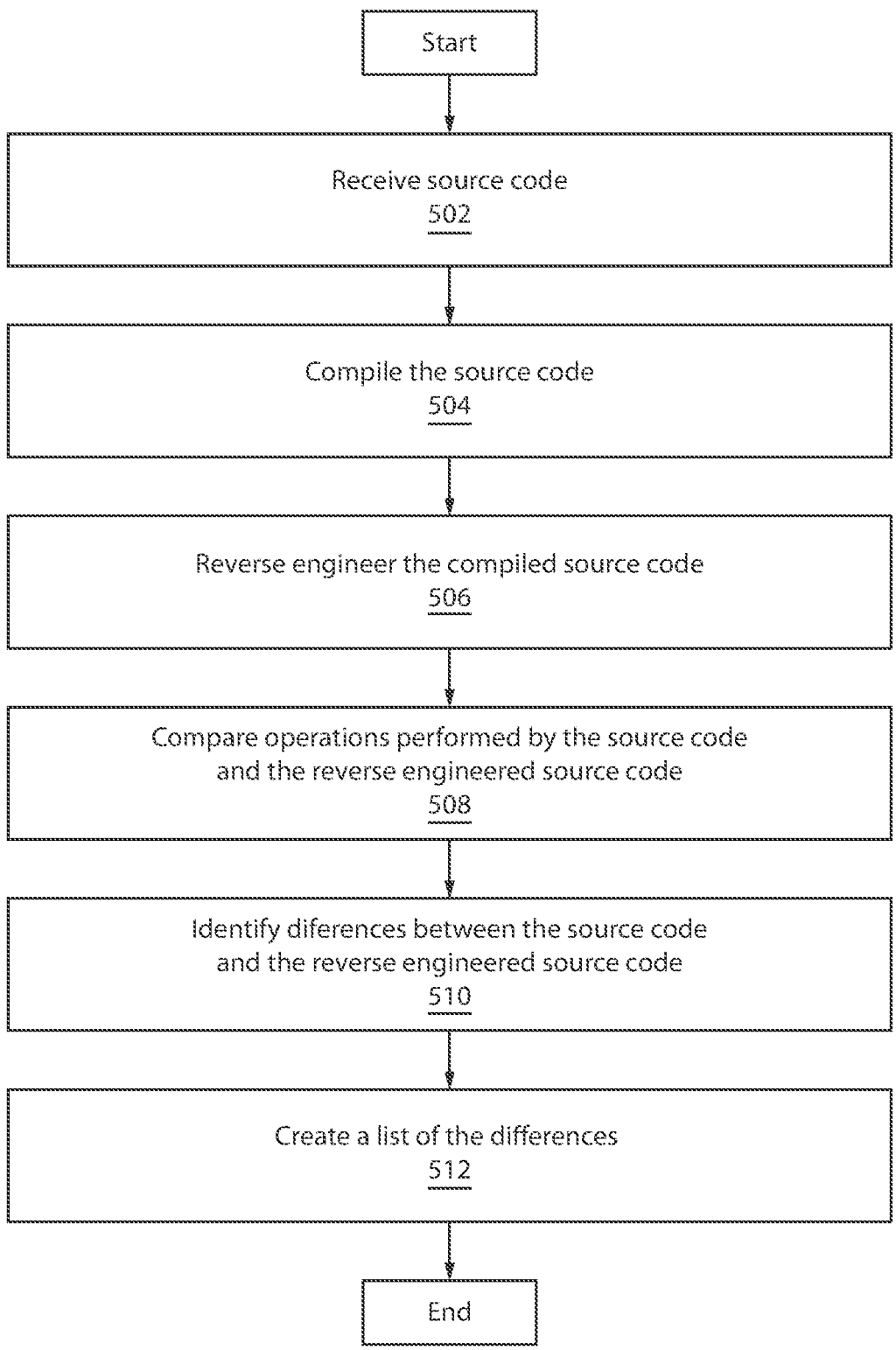
FIG. 5 is a block/flow diagram of an exemplary method for identifying code discrepancies, in accordance with an embodiment of the present invention.

FIG. 5 is a block/flow diagram of an exemplary method for identifying code discrepancies, in accordance with an embodiment of the present invention.

At block 502, source code is received.
At block 504, the source code is compiled.
At block 506, the compiled source code is reverse-engineered.
At block 508, operations performed by the source code (original or initial) and the reverse engineered source code are compared.
At block 510, differences between the source code (original or initial) and the reverse engineered source code are identified.
At block 512, a list of differences are created.

In conclusion, the exemplary embodiments of the present invention describe a method and system of detecting compiler injected security flaws. More specifically, the exemplary embodiments of the present invention describe the feature of using a tool to reverse engineer the compiled code and to perform a statistical comparison between the reverse engineered code and the actual or original or initial source code to detect abnormalities/flaws/discrepancies.

Still yet, any of the components of the present invention could be created, integrated, hosted, maintained, deployed, managed, serviced, etc. by a service supplier who offers to provide a method for detecting compiler-injected security flaws. Thus, the present invention describes a process for deploying, creating, integrating, hosting, maintaining, and/or integrating computing infrastructure, including integrating computer-readable code into the security flaw detection system 100 (FIG. 1), wherein the code in combination with the security flaw detection system 100 is capable of performing a method for detecting compiler-injected security flaws. In another embodiment, the invention provides a business method that performs the process blocks/steps of the invention on a subscription, advertising, and/or fee basis. That is, a service supplier, such as a Solution Integrator, could offer to provide a method for detecting compiler-injected security flaws. In this case, the service supplier can create, maintain, support, etc. a computer infrastructure that performs the process blocks/steps of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the one or more embodiments, the practical application or technical improvement over technologies found in the marketplace, or to enable others of ordinary skills in the art to understand the embodiments described herein.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for detecting compiler-injected security flaws (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on at least one processor for detecting compiler-injected security flaws, the method comprising:
    compiling source code via a compiler;
    reverse engineering the compiled source code via a reverse engineering module;
    comparing, via a statistical comparison tool, operations performed by the source code and the reverse engineered source code by determining a valid range of values of primitive operations to determine if an operation count matches, the statistical comparison tool, for the source code; and
    filtering, via a filter compiler optimization pattern module, conditions to remove or inject patterns that match compiler optimizations.

2. The method of claim 1, further comprising identifying code differences between the source code and the reverse engineered source code.

3. The method of claim 2, further comprising creating a list of code differences sent to a visualization tool to allow a user to analyze the code differences.

4. The method of claim 3, further comprising analyzing a boundary of each method call to determine an inventory of calls made, and for the reverse engineered source code, determining boundaries of method calls and matching the boundaries of method calls with actual method calls in the source code.

5. The method of claim 4, wherein the statistical comparison tool further compares an inventory of operations performed in the reverse engineered source code with a list of legal inventory operations that the source code wants to perform.

6. The method of claim 5, wherein, if a match does not occur between the inventory of operations performed in the reverse engineered source code with the list of legal inventory operations that the source code wants to perform, an alert is triggered.

7. The method of claim 6, wherein the statistical comparison tool matches potential sequences of operations and triggers further alerts if a sequence of the reversed engineered source code does not match a sequence of the source code.

8. The method of claim 1, wherein the comparing step further detects operation reordering.

9. The method of claim 8, wherein the operation reordering involves creating an inventory of checks and operations performed within a scope of a code block.

10. The method of claim 9, wherein the comparing step rejects ordering between the source code and the reverse engineered code.

11. The method of claim 3, wherein the list of code differences includes operations that are present in the source code and missing from binary code.

12. The method of claim 3, wherein the list of code differences includes operations that are present in binary code and missing from the source code.

13. The method of claim 1, further comprising creating a list of known compiler optimization patterns to test validity of conditions to eliminate false-positives.

14. The method of claim 1, wherein the statistical comparison tool determines a location where a new operation is triggered.

15. The method of claim 14, wherein the location is highlighted in the source code.

16. A computer-implemented method executed on at least one processor for identifying code discrepancies, the method comprising:
    performing a compare operation, via a statistical comparison tool, by comparing source code with reverse engineered source code by determining a valid range of values of primitive operations to determine if an operation count matches, the statistical comparison tool, for the source code;
    determining if boundaries of methods between the source code and the reverse engineered source code match;
    if a mismatch is detected, identifying code differences between the source code and the reverse engineered source code; and
    filtering, via a filter compiler optimization pattern module, conditions to remove or inject patterns that match compiler optimizations.

17. The method of claim 16, further comprising creating a list of code differences sent to a visualization tool to allow a user to analyze the code differences.

18. The method of claim 17, further comprising analyzing a boundary of each method call to determine an inventory of calls made, and for the reverse engineered source code, determining boundaries of method calls and matching the boundaries of method calls with actual method calls in the source code.

19. The method of claim 18, wherein the statistical comparison tool further compares an inventory of operations performed in the reverse engineered source code with a list of legal inventory operations that the source code wants to perform.

20. The method of claim 19, wherein, if a match does not occur between the inventory of operations performed in the reverse engineered source code with the list of legal inventory operations that the source code wants to perform, an alert is triggered.

* * * * *